US008731487B2

(12) United States Patent
He et al.

(10) Patent No.: US 8,731,487 B2
(45) Date of Patent: May 20, 2014

(54) DEVICE AND EQUIPMENT FOR FOUR-FREQUENCY TRANSCEIVING OF GLOBAL SYSTEM FOR MOBILE COMMUNICATION

(75) Inventors: Wenqing He, Shenzhen (CN); Juan Yu, Shenzhen (CN); Hu Ge, Shenzhen (CN)

(73) Assignee: ZTE Corporation, Shenzhen (CN)

(*) Notice: Subject to any disclaimer, the term of this patent is extended or adjusted under 35 U.S.C. 154(b) by 46 days.

(21) Appl. No.: 13/577,330

(22) PCT Filed: Sep. 19, 2010

(86) PCT No.: PCT/CN2010/077091
§ 371 (c)(1),
(2), (4) Date: Aug. 6, 2012

(87) PCT Pub. No.: WO2012/003663
PCT Pub. Date: Jan. 12, 2012

(65) Prior Publication Data
US 2012/0309329 A1 Dec. 6, 2012

(30) Foreign Application Priority Data
Jul. 7, 2010 (CN) .......................... 2010 1 0223521

(51) Int. Cl.
*H04B 1/44* (2006.01)
*H04B 1/46* (2006.01)
*H04M 1/00* (2006.01)

(52) U.S. Cl.
USPC ............................ 455/83; 455/82; 455/550.1

(58) Field of Classification Search
CPC ............ H04B 1/38; H04B 1/44; H04M 1/725
See application file for complete search history.

(56) References Cited

U.S. PATENT DOCUMENTS 6,690,949 B1  2/2004  Shamlou
7,835,712 B1  11/2010 Shi (Continued)

FOREIGN PATENT DOCUMENTS

CN  1761164 A     4/2006
CN  201252148 Y   6/2009

(Continued)

OTHER PUBLICATIONS

Supplementary European Search Report in European application number: 10854322.4, mailed on Jul. 1, 2013.

(Continued)

*Primary Examiner* — Yuwen Pan
*Assistant Examiner* — Ayodeji Ayotunde
(74) *Attorney, Agent, or Firm* — Oppedahl Patent Law Firm LLC

(57) ABSTRACT

The present disclosure discloses a device for four-frequency transceiving of a Global System for Mobile Communication (GSM), comprising a Power Amplifier (PA), a radio frequency transceiving chip, a baseband control chip, an antenna switch, a GSM low frequency filter and a GSM high frequency filter. The antenna switch receives a control signal transmitted from the baseband control chip, and the antenna switch connects to a corresponding line according to the control signal, and transmits signals between the antenna and the connected line; the GSM low frequency filter receives the signals of a first frequency band or a second frequency band which are transmitted by the antenna switch, and passes the signals of the first frequency band or the second frequency band; the GSM high frequency filter receives the signals of a third frequency band or a fourth frequency band which are transmitted by the antenna switch, and passes the signals of the third frequency band and the fourth frequency band. The present disclosure also discloses an equipment for four-frequency transceiving of GSM. By adopting the device and the equipment disclosed by the present disclosure, lines can be simplified, and the cost can be reduced.

12 Claims, 6 Drawing Sheets

(56) References Cited

U.S. PATENT DOCUMENTS

| | | | |
|---|---|---|---|
| 2003/0156668 A1 | 8/2003 | Atkinson et al. | |
| 2003/0157901 A1 | 8/2003 | Atkinson et al. | |
| 2003/0157909 A1 | 8/2003 | Atkinson et al. | |
| 2003/0157912 A1* | 8/2003 | Atkinson et al. | 455/234.1 |
| 2003/0157915 A1 | 8/2003 | Atkinson et al. | |
| 2004/0266378 A1 | 12/2004 | Fukamachi et al. | |
| 2006/0140828 A1 | 6/2006 | Winnington et al. | |
| 2006/0276158 A1* | 12/2006 | Okabe | 455/333 |
| 2007/0082622 A1* | 4/2007 | Leinonen et al. | 455/78 |
| 2008/0081567 A1* | 4/2008 | Rofougaran | 455/78 |
| 2008/0161038 A1 | 7/2008 | Lin et al. | |
| 2009/0180403 A1 | 7/2009 | Tudosoiu | |

FOREIGN PATENT DOCUMENTS

| | | |
|---|---|---|
| CN | 201397874 Y | 2/2010 |
| CN | 101663824 A | 3/2010 |
| EP | 1418680 A1 | 5/2004 |
| JP | 2005039765 A | 2/2005 |

OTHER PUBLICATIONS

International Search Report in international application number: PCT/CN2010/077091, mailed on Apr. 21, 2011.

English Translation of the Written Opinion of the International Search Authority in international application number: PCT/CN2010/077091, mailed on Apr. 21, 2011.

* cited by examiner

Prior Art

Prior Art

DEVICE AND EQUIPMENT FOR FOUR-FREQUENCY TRANSCEIVING OF GLOBAL SYSTEM FOR MOBILE COMMUNICATION

TECHNICAL FIELD

The present disclosure relates to the field of signal transceiving of Global System for Mobile Communication (GSM), and in particular to a device and an equipment for four-frequency transceiving of GSM.

BACKGROUND

The GSM mobile phones have a higher market share because of its popularization and low cost. The cost of a GSM mobile phone mainly depends on the radio frequency transceiving chip, the Power Amplifier (PA) and the antenna switch. Presently, the common low-end mobile phones are almost GSM double-frequency mobile phones, as the design of GSM four-frequency mobile phones causes higher cost. A GSM four-frequency mobile phone refers to a mobile phone that supports four frequency bands, including the 850 Mhz frequency band, the 900 Mhz frequency band, the 1800 Mhz frequency band and the 1900 Mhz frequency band.

FIG. 1 shows a hardware architecture diagram for transceiving of the GSM four-frequency mobile phones, comprising an antenna switch 101, a filter 102, a PA 104 and a radio frequency transceiving chip 103, wherein the antenna switch 101 transmits the signals received from the antenna to the filter 102 for filtration, and then transmits the filtered signals to the radio frequency transceiving chip 103; the radio frequency transceiving chip 103 transmits the signals to be transmitted to the PA 104 for power amplification, and then the power amplified signals are transmitted to the antenna switch 101, and then transmitted through the antenna; wherein, the antenna switch 101 is connected with the filter 102 through four signal lines, and the filter 102 comprises a GSM850 filter, a GSM900 filter, a GSM1800 filter and a GSM1900 filter; the filter 102 realizes the filtration for the signals of the different frequency bands via a resonator therein, the signals which have the same frequency band as the resonant frequency of the resonator are pass band signals that can pass the filter, and the signals outside the resonant frequency are stop band signals that can be removed by the filter. Meanwhile, in order to inhibit the signal errors effectively, the output signals of the filter 102 output differential signals; the radio frequency transceiving chip 103 comprises four receivers and four transmitters, wherein the four receivers are respectively used to receive differential signals transmitted by the four filters, and power amplify the received differential signals; the four transmitters are respectively used to convert the respectively received signals to radio frequency signals, which are then transmitted to the PA 104; the PA 104 is connected with the antenna switch 101 through the four signal lines transmitting the four frequency bands; the four-frequency antenna switch is costly, and the antenna switch is connected with the filter 102 and the PA 104 through eight lines, and three logic control lines are required to control the state of the switch; meanwhile, the filter 102 is connected with the radio frequency transceiving chip 103 through four groups of differential signal lines, and the PA 104 is connected with the radio frequency transceiving chip 103 through four lines; in connection with the higher cost, the lines are also complicated, which causes the layout of those lines to be difficult.

Presently, with the increased amplification capacity of the receiver and the PA, the GSM four-frequency transceiving hardware architecture shown in FIG. 2 is generally used. Different from FIG. 1, GSM850 filter and GSM900 filter are connected with the receiver of the radio frequency transceiving chip by sharing a group of differential signal lines; GSM1800 and GSM1900 are connected with the receiver of the radio frequency transceiving chip by sharing a group of differential signal lines; GSM850 frequency band and GSM900 frequency band share a transmitter for transmitting signals; GSM1800 frequency band and GSM1900 frequency band share a transmitter for transmitting signals; PA is connected with the antenna switch through two signal lines, wherein one line is used to transmit signals of GSM850 frequency band and GSM900 frequency band, and the other line is used to transmit signals of GSM1800 frequency band and GSM1900 frequency band. In this way, the transmitting lines and the receiving lines are simplified, and two transmitters and two receivers are saved. However, the antenna switch is connected with the filter and the PA through six signal lines, and three logic control lines are still required to control the antenna switch, the cost of the four-frequency antenna switch is not reduced.

SUMMARY

In view of the above, the main purpose of the present disclosure is to provide a device and an equipment for four-frequency transceiving of a GSM, which can simplify the lines, reduce production cost, and make the switching among the frequencies become more flexible.

In order to achieve the above purpose, the technical solution of the present disclosure is realized in this way:

the present disclosure provides a device for four-frequency transceiving of a Global System for Mobile Communication (GSM), including a Power Amplifier (PA), a radio frequency transceiver chip and a baseband control chip;

the device further including: a double-frequency antenna switch, a GSM low frequency filter and a GSM high frequency filter; wherein the double-frequency antenna switch is connected with the baseband control chip and is configured to receive control signals sent by the baseband control chip; and is connected with the PA, the GSM low frequency filter and the GSM high frequency filter; wherein, the double-frequency antenna switch is connected with a GSM low frequency band output line of the PA, or a GSM high frequency band output line of the PA, or the GSM low frequency filter or the GSM high frequency filter according to the control signals, and is configured to transmit signals between an antenna and the connected line;

the GSM low frequency filter is connected with the double-frequency antenna switch and the radio frequency transceiver chip, and is configured to: receive signals of a first frequency band or a second frequency band which are transmitted by the double-frequency antenna switch, make the signals of the first frequency band or the second frequency band pass and filter out signals of other frequency bands, and transmit the signals of the first frequency band or the second frequency band to the radio frequency transceiver chip; and the GSM high frequency filter is connected with the double-frequency antenna switch and the radio frequency transceiver chip, and is configured to: receive signals of a third frequency band or a fourth frequency band which are transmitted by the double-frequency antenna switch, make the signals of the third frequency band or the fourth frequency band pass and filter out signals of other frequency bands, and transmit the signals of the third frequency band or the fourth frequency band to the radio frequency transceiver chip.

In the above solution, the GSM low frequency filter may include a GSM first frequency band filter and a GSM second frequency band filter which are connected in parallel; or the GSM low frequency filter is a GSM low frequency wideband filter, in which two resonators which are connected in parallel are arranged, wherein resonant frequencies of the two resonators are respectively a first frequency of the first frequency band and a first frequency of the second frequency band; or the GSM low frequency filter is a GSM low frequency wideband filter, in which one resonator is arranged; wherein band pass of the resonator is expanded through disturbances, and the band pass is a frequency band between the first frequency of the first frequency band and the first frequency of the second frequency band.

In the above solution, the GSM high frequency filter may include a GSM third frequency band filter and a GSM fourth frequency band filter which are connected in parallel; or the GSM high frequency filter is a GSM high frequency wideband filter, in which two resonators which are connected in parallel are arranged, wherein resonant frequencies of the two resonators are respectively a first frequency of the third frequency band and a first frequency of the fourth frequency band; or the GSM high frequency filter is a GSM high frequency wideband filter, in which one resonator is arranged, wherein a band pass of the resonator is expanded through disturbances, and the band pass is a frequency band between the first frequency of the third frequency band and the first frequency of the fourth frequency band.

In the above solution, the double-frequency antenna switch may be connected with the baseband control chip through two control signal lines and receives the control signals.

The present disclosure also discloses an equipment for four-frequency transceiving of a Global System for Mobile Communication (GSM), including an input-output device, a signal processing device and a device for four-frequency transceiving of a GSM; wherein, the device for four-frequency transceiving of a GSM includes a Power Amplifier (PA), a radio frequency transceiver chip and a baseband control chip; wherein, the device for four-frequency transceiving of the GSM further includes a double-frequency antenna switch, a GSM low frequency filter and a GSM high frequency filter; wherein:

the double-frequency antenna switch is connected with the baseband control chip and is configured to receive control signals sent by the baseband control chip; and is connected with the PA, the GSM low frequency filter and the GSM high frequency filter; wherein, the double-frequency antenna switch is connected with a low frequency band output line of the PA, or a high frequency band output line of the PA, or the GSM low frequency filter or the GSM high frequency filter according to the control signals, and is configured to transmit signals between the antenna and the connected line;

the GSM low frequency filter is connected with the double-frequency antenna switch and the radio frequency transceiver chip, and is configured to: receive signals of a first frequency band or a second frequency band which are transmitted by the double-frequency antenna switch, make the signals of the first frequency band or the second frequency band pass and filter out signals of other frequency bands, and transmit the signals of the first frequency band or the second frequency band to the radio frequency transceiver chip;

the GSM high frequency filter is connected with the double-frequency antenna switch and the radio frequency transceiver chip, and is configured to: receive signals of a third frequency band or a fourth frequency band which are transmitted by the double-frequency antenna switch, make the signals of the third frequency band or the fourth frequency band pass and filter out signals of other frequency bands, and transmit the signals of the third frequency band or the fourth frequency band to the radio frequency transceiver chip.

In the above solution, the GSM low frequency filter may include a GSM first frequency band filter and a GSM second frequency band filter which are connected in parallel; or the GSM low frequency filter is a GSM low frequency wideband filter, in which two resonators which are connected in parallel are arranged; wherein resonant frequencies of the two resonators are respectively a first frequency of the first frequency band and a first frequency of the second frequency band; or the GSM low frequency filter is a GSM low frequency wideband filter, in which one resonator is arranged in the GSM low frequency wideband filter; wherein a band pass of the resonator is expanded through disturbances, and the band pass is a frequency band between the first frequency of the first frequency band and the first frequency of the second frequency band.

In the above solution, the GSM high frequency filter may include a GSM third frequency band filter and a GSM fourth frequency band filter which are connected in parallel; or the GSM high frequency filter is the GSM high frequency wideband filter, in which two resonators which are connected in parallel are arranged; wherein resonant frequencies of the two resonators are respectively a first frequency of the third frequency band and a first frequency of the fourth frequency band; or the GSM high frequency filter is the GSM high frequency wideband filter, in which one resonator is arranged; wherein a band pass of the resonator is expanded through disturbances, and the band pass is a frequency band between the first frequency of the third frequency band and the first frequency of the fourth frequency band.

In the above solution, the double-frequency antenna switch may be connected with the baseband control chip through two control signal lines and receives the control signals.

It can be seen that, by adopting the device and the equipment for four-frequency transceiving of GSM, the GSM low frequency filter can synchronously filter the first frequency band and the second frequency band, the GSM high frequency filter can synchronously filter the third frequency band and the fourth frequency band; as the double-frequency antenna switch is connected with the GSM low frequency filter, the GSM high frequency filter and the PA, the production cost is reduced, and the lines are simplified; and as mobile terminals switch between the first frequency band and the second frequency band, and between the third frequency band and the fourth frequency band, without the help of an antenna switch, the switching procedure is simplified.

DETAILED DESCRIPTION

The basic idea of the present disclosure: the double-frequency antenna switch connects corresponding lines according to control signals transmitted by the baseband control chip; GSM low frequency filter or GSM high frequency filter filters signals transmitted by the double-frequency antenna switch, and then transmits the filtered signals to the radio frequency transceiving chip; the GSM low frequency band output line or the GSM high frequency band output line of the PA power amplifies the output signals transmitted by the radio frequency transceiving chip, and transmits the power amplified output signals to the double-frequency antenna switch, and the transceiving of four-frequency signals is realized through the double-frequency antenna switch;

The corresponding lines comprise a line which is connected with the GSM low frequency filter, or a line which is connected with the GSM high frequency filter, or a line which is connected with the GSM low frequency band output end of the PA, or the line which is connected with GSM high frequency band output end of the PA. The GSM low frequency filter is the filter that passes signals of the first frequency band and the second frequency band; the GSM high frequency filter is the filter that passes signals of the third frequency band and the fourth frequency band; the GSM low frequency band output end of the PA is the output which outputs the first frequency band and the second frequency band, and the GSM high frequency band output end is the output which outputs the third frequency band and the fourth frequency band, wherein the frequency of the first frequency band and the second frequency band is lower than that of the third frequency band and the fourth frequency band.

The present disclosure is described in detail with reference to the drawings and the embodiments, wherein the present disclosure is described by taking the first frequency band being 850 Mhz frequency band, the second frequency band being 900 Mhz frequency band, the third frequency band being 1800 Mhz frequency band, and the fourth frequency band being 1900 Mhz frequency band as an example.

Figure 1:
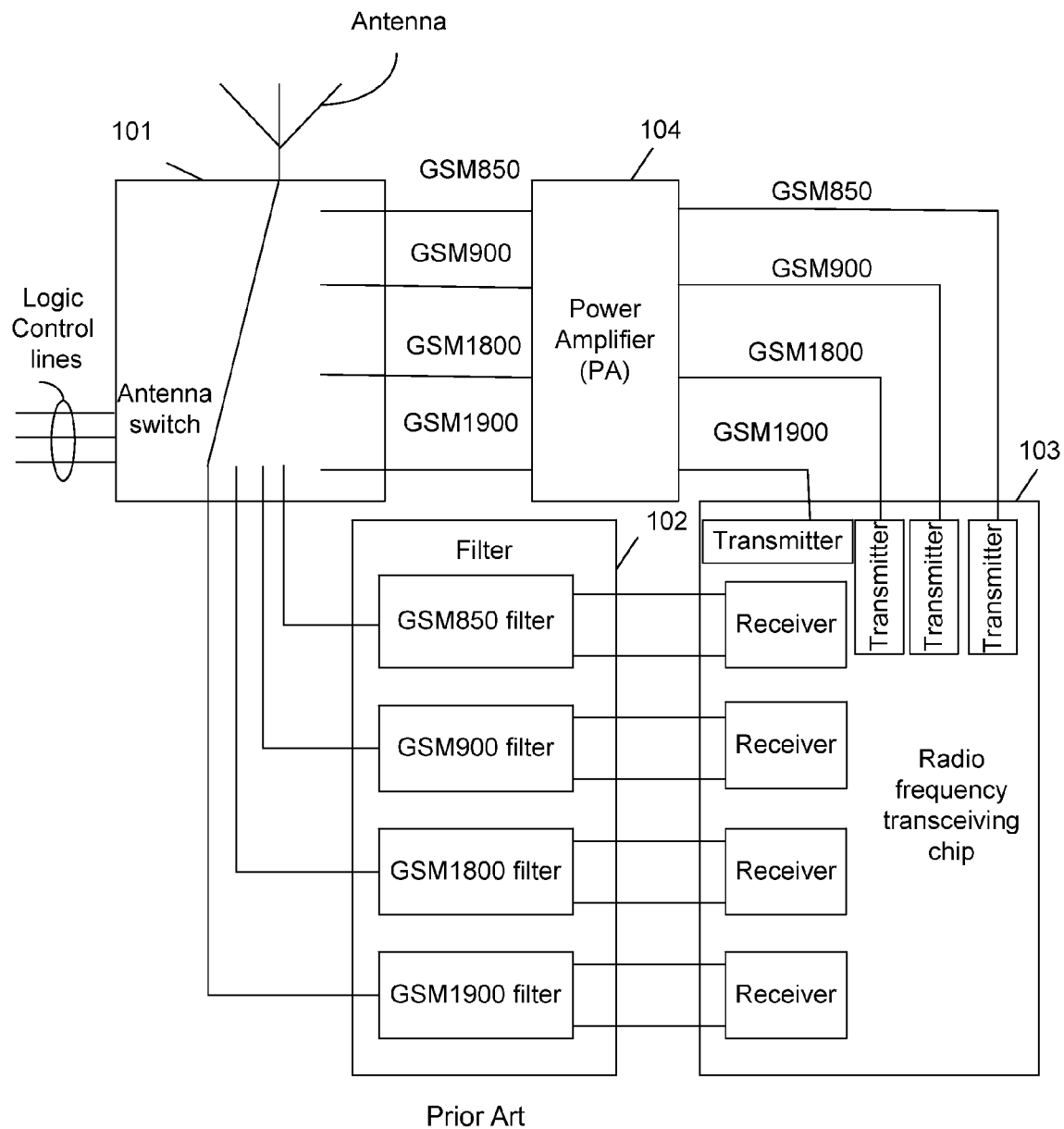
FIG. 1 illustrates a device for four-frequency transceiving of GSM in the prior art.
Figure 2:
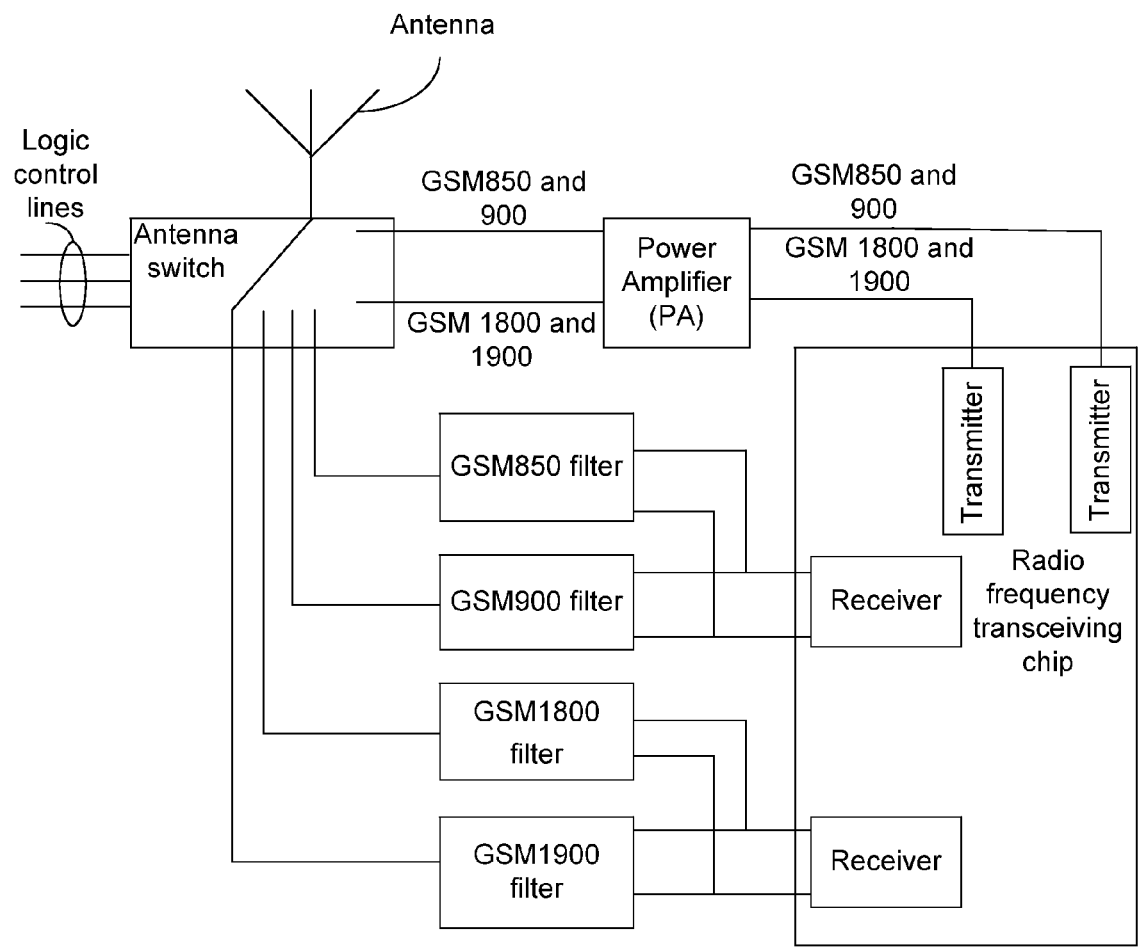
FIG. 2 illustrates a simplified device for four-frequency transceiving of GSM in the prior art.
Figure 3:
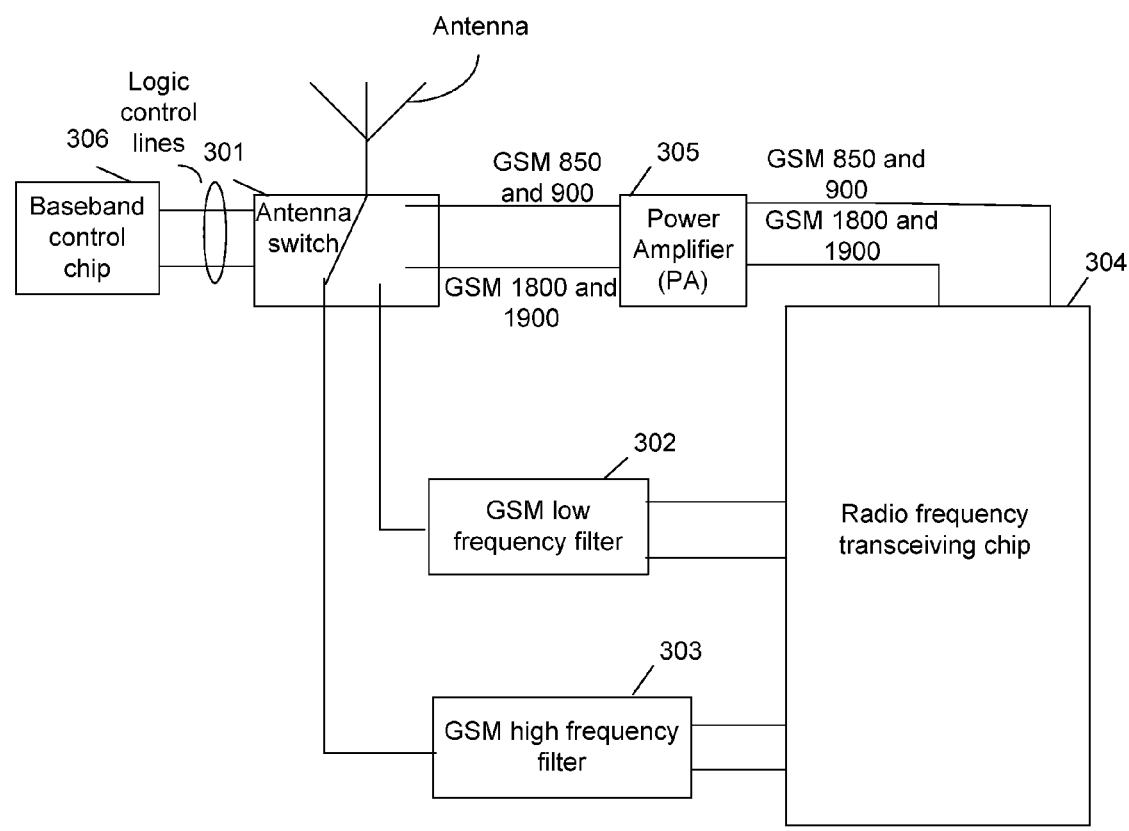
FIG. 3 illustrates a diagram of a device for four-frequency transceiving of GSM according to the present disclosure.

FIG. 3 shows a device for four-frequency transceiving of the GSM, comprising a double-frequency antenna switch 301, a GSM low frequency filter 302, a GSM high frequency filter 303, a radio frequency transceiving chip 304, a PA 305 and a baseband control chip 306;

the baseband control chip 306 connected with the double-frequency antenna switch 301 is configured to search a code table in a database according to a current network frequency band of the mobile terminal, acquire the control signals corresponding to the input signals and output signals of the current frequency band, and transmit the control signals to the double-frequency antenna switch 301; the current network frequency band of the mobile terminal is stored by the baseband control chip 306; the code table contains the frequency band and the control signals, wherein the input signals or the output signals of the frequency band uniquely corresponds to the control signals; for example, the control signal corresponds to the input signal of the 850 Mhz and 900 Mhz frequency band is 00, and the control signal corresponds to the output signal thereof is 01; thus, the double-frequency antenna switch 301 will be connected to the GSM low frequency filter 302 when the control signal 00 is transmitted to the double-frequency antenna switch 301; and the double-frequency antenna switch 301 will be connected to the GSM850 and GSM900 output line when the control signal 01 is transmitted to the double-frequency antenna switch 301;

the double-frequency antenna switch 301, which is connected with baseband control chip 306, GSM low frequency filter 302, GSM high frequency filter 303 and PA305, is configured to connect with GSM1800 and GSM1900 output line of PA305, or GSM850 and GSM900 output line of PA305, or GSM low frequency filter 302 or GSM high frequency filter 303 to transmit signals between the antenna and the lines according to the received control signals;

GSM low frequency filter 302, which is connected with the double-frequency antenna switch 301 and the radio frequency transceiving chip 304, receives signals of GSM850 frequency band or GSM900 frequency band transmitted from the double-frequency antenna switch 301, passes signals of the 850 Mhz frequency band or the 900 Mhz frequency band, and the passed signals are transmitted to the radio frequency transceiving chip 304, the signals other than 900 Mhz frequency band or 850 Mhz frequency band are removed; and a filter loss lower than −3 dBm is acceptable;

the GSM high frequency filter 303, which is connected with the double-frequency antenna switch 301 and the radio frequency transceiving chip 304, receives signals of GSM1800 frequency band or GSM1900 frequency band transmitted from the double-frequency antenna switch 301, passes signals of the 1800 Mhz frequency band or the 1900 Mhz frequency band, the passed signals are transmitted to the radio frequency transceiving chip 304, the signals other than the 1800 Mhz frequency band or the 1900 Mhz frequency band are removed; and a filter loss lower than −3 dBm is acceptable;

the radio frequency transceiving chip 304, which is connected with GSM low frequency filter 302, GSM high frequency filter 303 and PA 305, receives the signals filtered by GSM low frequency filter 302 or GSM high frequency filter 303, and power amplifies the filtered signals; and receives the low frequency digital signals to be transmitted, converts the low frequency digital signals to radio frequency signals, and then transmits the radio frequency signals to PA 305; the conversion is to modulate the low frequency digital signals to be transmitted to signals of GSM1800 and GSM1900 frequency bands, or signals of GSM850 and GSM900 frequency bands;

PA 305, which is connected with the radio frequency transceiving chip 304 and the double-frequency antenna switch 301, power amplifies the received radio frequency signals of the GSM850 and GSM900 frequency bands, and transmits the power amplified radio frequency signals to the antenna via the output line between the GSM850 and GSM900 and the double-frequency antenna switch 301, and then the antenna transmits the power amplified radio frequency signals; or power amplifies the received radio frequency signals of the GSM1800 and GSM1900 frequency bands, and transmits the power amplified radio frequency signals to the antenna via the output line connected between the GSM1800 and GSM1900 and the double-frequency antenna switch 301, and then the antenna transmits the power amplified radio frequency signals.

The double-frequency antenna switch 301 concretely comprises four lines, i.e. four states, wherein one line is connected with the GSM low frequency filter 302, one line is connected with the GSM high frequency filter 303, one line is connected with the GSM850 and GSM900 output line of the PA 305, and one line is connected with the GSM1800 and GSM1900 output line of the PA 305;

correspondingly, the baseband control chip 306 is connected with the double-frequency antenna switch 301 through two control signal lines for transmitting control signals.

Figure 4:
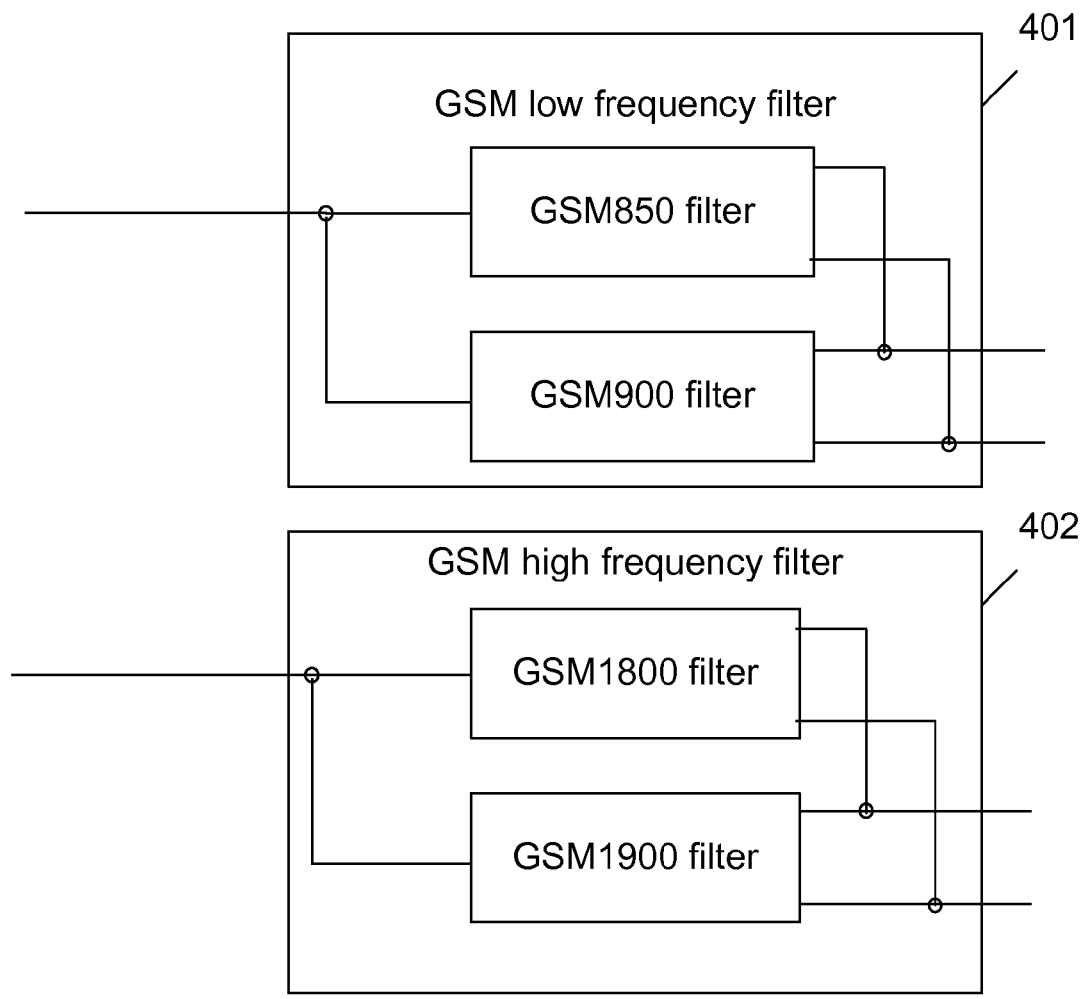
FIG. 4 illustrates structures of GSM low frequency filter and GSM high frequency filter according to the present disclosure.
Figure 5:
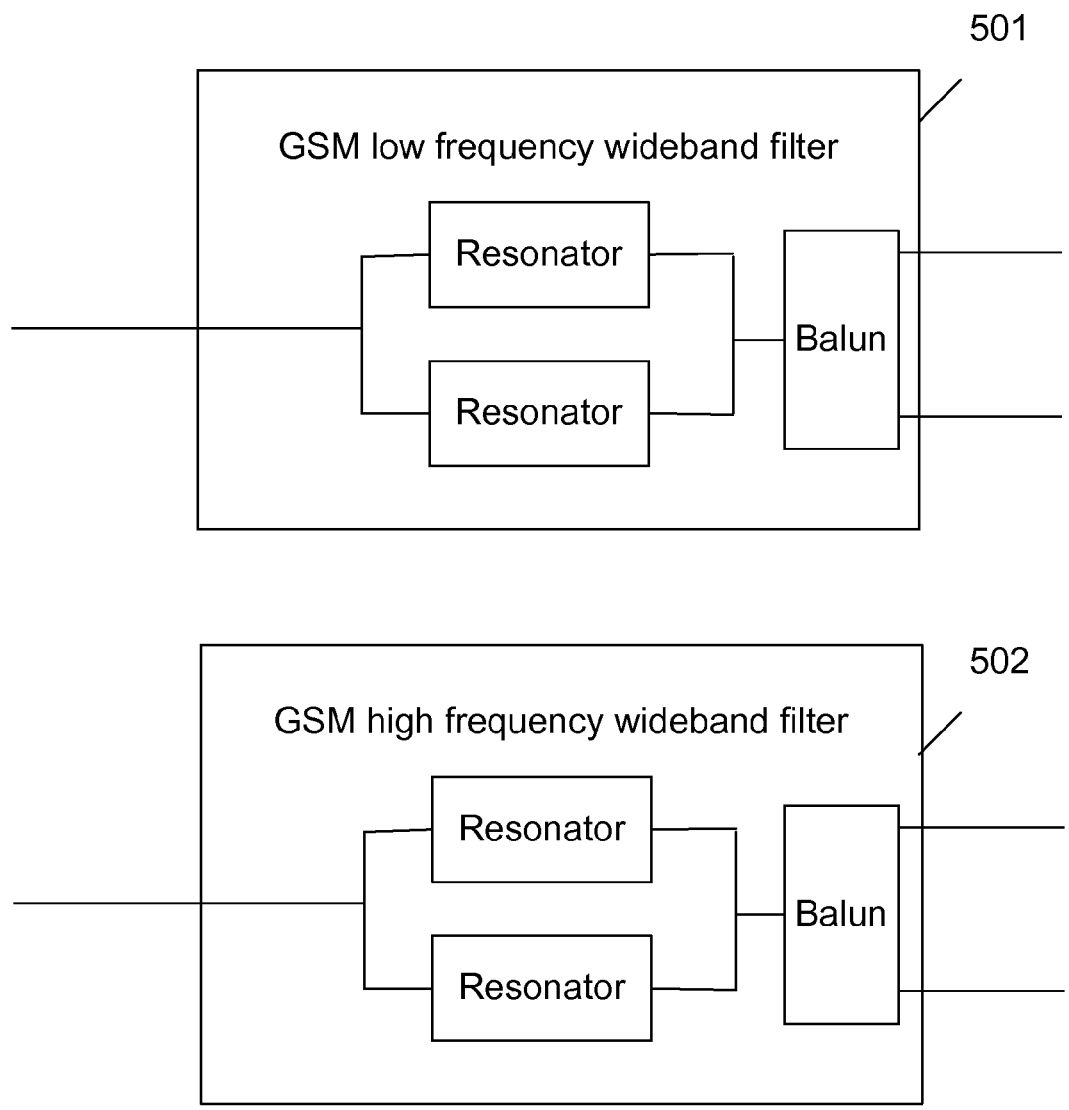
FIG. 5 illustrates structures of another GSM low frequency filter and GSM high frequency filter according to the present disclosure.

The GSM low frequency filter 302 concretely comprises GSM850 filter, GSM900 filter, and the structure of the GSM low frequency filter 302 is shown in 401 of FIG. 4; the GSM850 filter and the GSM900 filter are connected in parallel, wherein one resonator is embedded in the GSM850 filter, the resonant frequency of the resonator is 850 Mhz (also referred as the first frequency of the first frequency band), and signals of 850 Mhz frequency band passes the resonator, and signals other than 850 Mhz frequency band are removed; one resonator is embedded in the GSM900 filter, and the resonant frequency of the resonator is 900 Mhz (also referred as the first frequency of the second frequency band), and signals of 900 Mhz frequency band passes the resonator, and signals other than 900 Mhz frequency band are removed; or the GSM low frequency filter is a GSM low frequency wideband filter, the band pass of the resonator therein is expanded through disturbances, such that the band pass is within a range of 850 frequency band to 900 frequency band; the disturbance expansion refers to making the resonator to have two resonant frequencies; any one of the traditional arts can be adopted to implement expansion, as long as the two expanded resonant frequencies are respectively 850 Mhz and 900 Mhz; thereby the band pass of the resonator is 850 Mhz to 900 Mhz frequency bands, signals of 850 Mhz to 900 Mhz frequency bands can pass, while signals other than 850 Mhz to 900 Mhz frequency bands are removed; or as shown in 501 of FIG. 5, the two resonators are connected in parallel, and the filtered signals are output through Balun; Balun is used to generate differential signals, and the resonant frequencies of the two resonators are 850 Mhz and 900 Mhz, respectively.

The GSM high frequency filter concretely comprises GSM1800 filter and GSM1900 filter, and the structure of the GSM high frequency filter 402 is shown in 402 of FIG. 4, which are connected in parallel, wherein one resonator is embedded in the GSM1800 filter, the resonant frequency of the resonator is 1800 Mhz (also referred as the first frequency of the third frequency band), and signals of 1800 Mhz frequency band passes the resonator, and signals other than 1800 Mhz frequency band are removed; one resonator is embedded in the GSM1900 filter, and the resonant frequency of the resonator is 1900 Mhz (also referred as the first frequency of the fourth frequency band), and signals of 1900 Mhz frequency band passes the resonator, and signals other than 1900 Mhz frequency band are removed; or the GSM high frequency filter is the GSM high frequency wideband filter, the band pass of the resonator therein is expanded through disturbances, such that the band pass is within a range of 1800 frequency band to 1900 frequency band; the disturbance expansion refers to making the resonator to have two resonant frequencies; any one of the traditional arts can be adopted to implement the expansion, as long as the two expanded resonant frequencies are respectively 1800 Mhz and 1900 Mhz; thereby the band pass of the resonator is 1800 Mhz to 1900 Mhz frequency bands, signals of 1800 Mhz to 1900 Mhz frequency bands are can pass, and signals other than 1800 Mhz to 1900 Mhz frequency bands are removed; or as shown in 502 of FIG. 5, the two resonators are connected in parallel, and the filtered signals are output through Balun; the resonant frequencies of the two resonators are 1800 Mhz and 1900 Mhz, respectively.

In the above device, if the loss of the GSM low frequency filter 302 or the GSM high frequency filter 303 is overlarge, an inductor and a capacitor may be placed between the double-frequency antenna switch 301 and the GSM low frequency filter 302 or the GSM high frequency filter 303, such that the input impedance of the GSM low frequency filter 302 or the GSM high frequency filter 303 keep at 50 ohms.

By adopting the above device, if the network frequency band of the mobile terminal is switched between 850 Mhz frequency band and 900 Mhz frequency band, or switched between 1800 Mhz frequency band and 1900 Mhz frequency band, it is unnecessary to switch the double-frequency antenna switch, so that the switching procedure is simplified.

Figure 6:
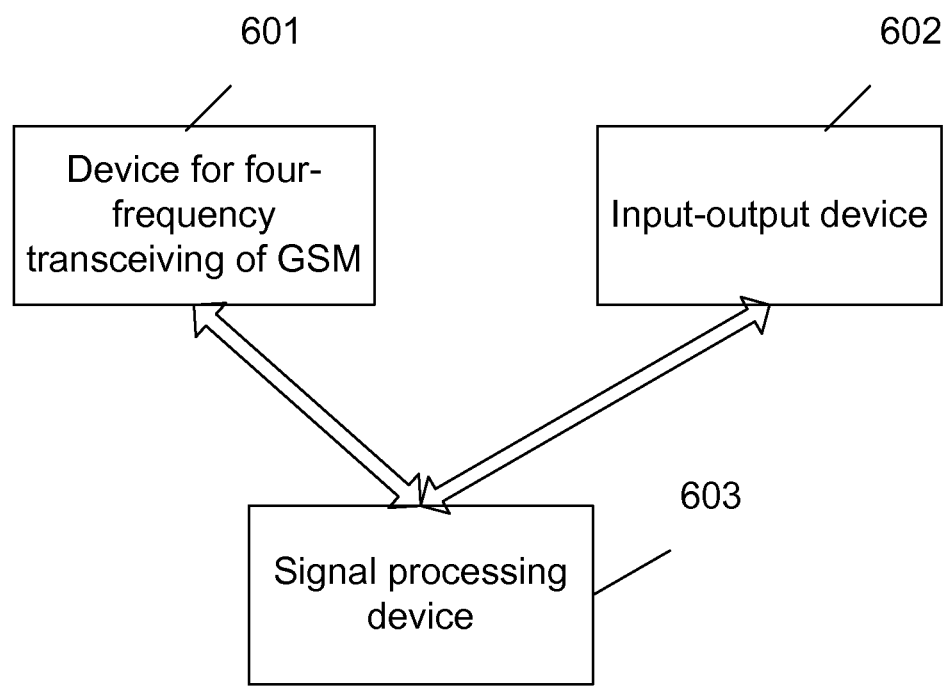
FIG. 6 illustrates a diagram of an equipment for four-frequency transceiving of GSM according to the present disclosure.

Based on the above device, the present disclosure further provides an equipment for four-frequency transceiving for the GSM, as shown in FIG. 6, the device comprises: a signal processing device 603, a device for four-frequency transceiving of GSM 601 and an input-output device 602;

the device for four-frequency transceiving of GSM 601 is configured to receive signals of four frequency bands, and filters and power amplifies the received signals, and transmits the filtered and power amplified signals to the signal processing means 603; receive signals of corresponding frequency bands which are transmitted from the signal processing means 603, convert the received signals to radio frequency signals, and power amplifies the radio frequency signals, and then the power amplified radio frequency signals are transmitted;

the signal processing device 603 is configured to process the received signals, and convert the received signals to the signals that can be identified by the input-output device 602; and configured to receive the signals inputted from the input-output device 602, convert the received signals to digital signals through signal processing, and the transmit the digital signals to the device for four-frequency transceiving of GSM 601;

the input-output device 602 is configured to receive and transmit the signals of the signal processing device 603, receive external signals, and transmit the external signals to the signal processing device 603.

The device for four-frequency transceiving of GSM 601 and the device for four-frequency transceiving of GSM as shown in FIG. 3 have the same structure and functions of all parts, details are not described again.

The above is only a preferred embodiment of the present disclosure and is not intended to limit the scope the present disclosure, and any modifications, equivalent replacements, improvements or the like within the principle of the present disclosure shall fall within the scope of the present disclosure.

What is claimed is:

1. A device for four-frequency transceiving of a Global System for Mobile Communication (GSM), comprising a Power Amplifier (PA), a radio frequency transceiver chip and
   a double-frequency antenna switch, a GSM low frequency filter and a GSM high frequency filter and characterised by a double frequency antenna switch and a baseband control chip and in that:
   the double-frequency antenna switch is connected with the baseband control chip and is configured to receive control signals sent by the baseband control chip; and, according to the control signals, to transmit signals between an antenna and one of only four lines of which two are connected with the PA, one is connected to the GSM low frequency filter and one is connected to the GSM high frequency filter; wherein, the double-frequency antenna switch may be connected by only one line with a GSM low frequency band output line of the PA, or a GSM high frequency band output line of the PA, or the GSM low frequency filter or the GSM high frequency filter;

the GSM low frequency filter is connected with the double-frequency antenna switch and the radio frequency transceiver chip, and is configured to:
receive signals of a first frequency band or a second frequency band which are transmitted by the double-frequency antenna switch via a single line, make the signals of the first frequency band or the second frequency band pass and filter out signals of other frequency bands, and transmit the signals of the first frequency band or the second frequency band to the radio frequency transceiver chip; and
the GSM high frequency filter is connected with the double-frequency antenna switch and the radio frequency transceiver chip, and is configured to:
receive signals of a third frequency band or a fourth frequency band which are transmitted by the double-frequency antenna switch via a single line, make the signals of the third frequency band or the fourth frequency band pass and filter out signals of other frequency bands, and transmit the signals of the third frequency band or the fourth frequency band to the radio frequency transceiver chip.

2. The device according to claim 1, wherein:
the GSM low frequency filter comprises a GSM first frequency band filter and a GSM second frequency band filter which are connected in parallel; or
the GSM low frequency filter is a GSM low frequency wideband filter, in which two resonators which are connected in parallel are arranged; wherein resonant frequencies of the two resonators are respectively a first frequency of the first frequency band and a first frequency of the second frequency band; or
the GSM low frequency filter is a GSM low frequency wideband filter, in which one resonator is arranged; wherein band pass of the resonator is expanded through disturbances, and the band pass is a frequency band between the first frequency of the first frequency band and the first frequency of the second frequency band.

3. The device according to claim 1, wherein:
the GSM high frequency filter comprises a GSM third frequency band filter and a GSM fourth frequency band filter which are connected in parallel; or
the GSM high frequency filter is a GSM high frequency wideband filter, in which two resonators which are connected in parallel are arranged; wherein resonant frequencies of the two resonators are respectively a first frequency of the third frequency band and a first frequency of the fourth frequency band; or
the GSM high frequency filter is a GSM high frequency wideband filter, in which one resonator is arranged; wherein a band pass of the resonator is expanded through disturbances, and the band pass is a frequency band between the first frequency of the third frequency band and the first frequency of the fourth frequency band.

4. The device according to claim 1, wherein,
the double-frequency antenna switch is connected with the baseband control chip through two control signal lines and receives the control signals.

5. An equipment for four-frequency transceiving of a Global System for Mobile Communication (GSM), comprising an input-output device, a signal processing device and a device for four-frequency transceiving of a GSM; wherein, the device for four-frequency transceiving of a GSM comprises a Power Amplifier (PA), a radio frequency transceiver chip and a double-frequency antenna switch, a GSM low frequency filter and a GSM high frequency filter and characterised by a double frequency antenna switch and a baseband control chip and in that:
the double-frequency antenna switch is connected with the baseband control chip and is configured to receive control signals sent by the baseband control chip; and according to the control signals, to transmit signals between an antenna and one of only four lines of which two are connected with the PA, one is connected to the GSM low frequency filter and one is connected to the GSM high frequency filter; wherein, the double-frequency antenna switch may be connected by only one line with a low frequency band output line of the PA, or a high frequency band output line of the PA, or the GSM low frequency filter or the GSM high frequency filter;
the GSM low frequency filter is connected with the double-frequency antenna switch and the radio frequency transceiver chip, and is configured to:
receive signals of a first frequency band or a second frequency band which are transmitted by the double-frequency antenna switch via a single line, make the signals of the first frequency band or the second frequency band pass and filter out signals of other frequency bands, and transmit the signals of the first frequency band or the second frequency band to the radio frequency transceiver chip; and
the GSM high frequency filter is connected with the double-frequency antenna switch and the radio frequency transceiver chip, and is configured to:
receive signals of a third frequency band or a fourth frequency band which are transmitted by the double-frequency antenna switch via a single line, make the signals of the third frequency band or the fourth frequency band pass and filter out signals of other frequency bands, and transmit the signals of the third frequency band or the fourth frequency band to the radio frequency transceiver chip.

6. The equipment according to claim 5, wherein,
the GSM low frequency filter comprises a GSM first frequency band filter and a GSM second frequency band filter which are connected in parallel; or
the GSM low frequency filter is a GSM low frequency wideband filter, in which two resonators which are connected in parallel are arranged; wherein resonant frequencies of the two resonators are respectively a first frequency of the first frequency band and a first frequency of the second frequency band; or
the GSM low frequency filter is a GSM low frequency wideband filter, in which one resonator is arranged in the GSM low frequency wideband filter; wherein a band pass of the resonator is expanded through disturbances, and the band pass is a frequency band between the first frequency of the first frequency band and the first frequency of the second frequency band.

7. The equipment according to claim 5, wherein,
the GSM high frequency filter comprises a GSM third frequency band filter and a GSM fourth frequency band filter which are connected in parallel; or,
the GSM high frequency filter is the GSM high frequency wideband filter, in which two resonators which are connected in parallel are arranged; wherein resonant frequencies of the two resonators are respectively a first frequency of the third frequency band and a first frequency of the fourth frequency band; or
the GSM high frequency filter is the GSM high frequency wideband filter, in which one resonator is arranged; wherein a band pass of the resonator is expanded through disturbances, and the band pass is a frequency band between the first frequency of the third frequency band and the first frequency of the fourth frequency band.

8. The equipment according to claim 5, wherein,
the double-frequency antenna switch is connected with the baseband control chip through two control signal lines and receives the control signals.

9. The device according to claim 2, wherein,
the double-frequency antenna switch is connected with the baseband control chip through two control signal lines and receives the control signals.

10. The device according to claim 3, wherein,
the double-frequency antenna switch is connected with the baseband control chip through two control signal lines and receives the control signals.

11. The equipment according to claim 6, wherein,
the double-frequency antenna switch is connected with the baseband control chip through two control signal lines and receives the control signals.

12. The equipment according to claim 7, wherein,
the double-frequency antenna switch is connected with the baseband control chip through two control signal lines and receives the control signals.

* * * * *